United States Patent [19]

Sekiguchi

[11] 4,410,767
[45] Oct. 18, 1983

[54] KEY TELEPHONE SYSTEM

[75] Inventor: Kouichi Sekiguchi, Asaka, Japan

[73] Assignee: Iwasaki Tsushinki Kabushiki Kaisha, Tokyo, Japan

[21] Appl. No.: 66,927

[22] Filed: Aug. 16, 1979

Related U.S. Application Data

[63] Continuation of Ser. No. 797,696, May 17, 1977, abandoned.

[30] Foreign Application Priority Data

May 17, 1976 [JP] Japan .................................. 51/55315
May 17, 1976 [JP] Japan .................................. 51/55316
May 17, 1976 [JP] Japan .................................. 51/55317
May 17, 1976 [JP] Japan .................................. 51/55318
May 17, 1976 [JP] Japan .................................. 51/55319

[51] Int. Cl.³ .......................... H04Q 5/20; H04M 9/06
[52] U.S. Cl. .............................. 179/99 R; 179/99 LC; 179/17 E
[58] Field of Search .............. 179/99 R, 99 M, 99 A, 179/18 FA, 17 R, 17 E, 84 A, 99 LS, 99 LC

[56] References Cited

U.S. PATENT DOCUMENTS 3,210,479 10/1965 Engelschall ...................... 179/17 E
3,450,844 6/1979 MacDowell ...................... 179/17 E
3,649,778 3/1972 Suntop et al. .................... 179/17E
3,865,995 2/1975 Kerman et al. ................. 179/99 LC
3,906,168 9/1975 McEowcn ....................... 179/99 LS
4,022,985 5/1977 Tanoka ............................ 179/99 R Primary Examiner—Gerald L. Brigance
Attorney, Agent, or Firm—Robert E. Burns; Emmanuel J. Lobato; Bruce L. Adams

[57] ABSTRACT

A key telephone system in which a key service unit is provided for selectively connecting a plurality of key telephone sets to at least a pair of CO lines through at least one control line provided in correspondence to the CO lines and a common line. The key service unit comprises a DC power source for producing two outputs respectively having certain positive and negative potential differences with respect to a reference potential, at least one first detector provided in correspondence to the CO lines and selectively connected to the control line for detecting the state in which one of the two output voltages is applied across the control line and the common line to flow a current of predetermined value, at least one second detector provided in correspondence to the CO lines and selectively connected to the control line for detecting the state in which the other of the two output voltages is applied across the control line and the common line to flow a current larger than a certain value, and at least one switching means provided in correspondence to the CO lines for disconnecting the first detector from the control line and for connecting the second detector to the control line when the first detector produces an output.

34 Claims, 10 Drawing Figures

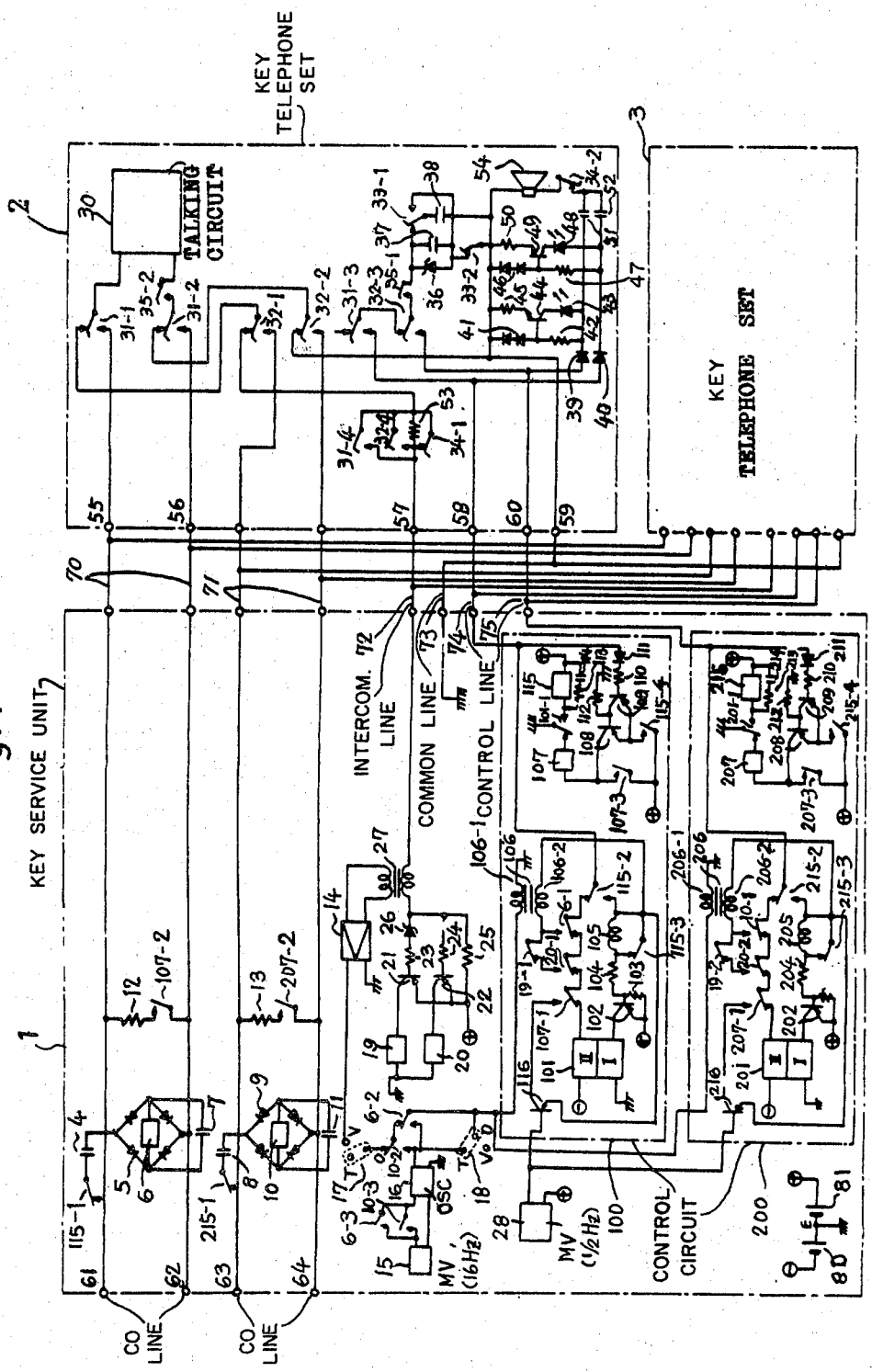

KEY TELEPHONE SYSTEM

This is a continuation of application Ser. No. 797,696, filed May 17, 1977 and now abandoned.

This invention relates to a key telephone system.

Heretofore, key telephone systems of this kind require dozen of cable conductors and this constitutes serious obstacle in the economical and special aspects of cable laying.

To overcome these defects, an object of this invention is to provide a key telephone system which materially reduces the number of cable conductors needed in the prior art to enable to use of a cable employing a pair of taking lines and one control line, for a CO line, and one common line regardless of the number of CO lines used.

Another object of this invention is to provide a key telephone system which is constructed to employ a cable having a very small number of conductors and sends out signals of individually predetermined different frequencies of respective key telephone sets by a push-button operation to achieve an easy intercomm. calling operation and adopted to enable an audible indication of an incoming call from a CO line.

In accordance with this invention, dozens of cable conductors required in the prior art, for example, twenty in the case of two CO lines and forty in the case of five CO lines, can be sharply reduced to, for instance, eight in the case of two CO lines and sixteen in the case of five CO lines.

The principle, construction and operation of this invention will be clearly understood from the following detailed description taken in conjunction with accompanying drawings, in which:

FIG. 1 is a circuit diagram illustrating an embodiment of this invention:

Figure 2A:
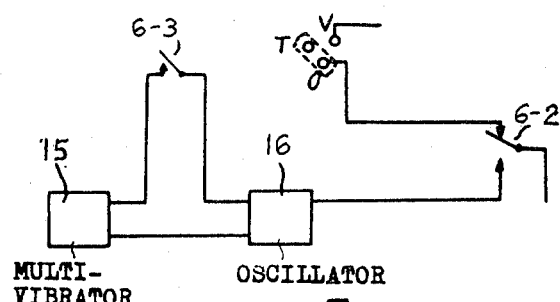
FIGS. 2A, 2B, 3A, 3B, 4 and 5 are circuit diagrams each illustrating a modification of a part of the embodiment shown in FIG. 1.

With reference to the drawings, this invention will hereinafter be described in detail.

To facilitate a better understanding of this invention, the key service unit used in this invention will be described together with a key telephone set.

FIG. 1 shows an embodiment of this invention. Reference numeral 1 indicates the key service unit, and 2 and 3 designate key telephone sets. Since the key telephone set 3 has the same circuit construction as the key telephone set 2, the detailed circuit of the telephone set 3 is not illustrated. Reference numerals 5 and 9 identify bridge rectifiers, each composed of four diodes. Reference numerals 4, 7, 8, 11, 37, 38, 51, 114 and 214 denote capacitors; 6, 10, 19, 20, 101, 107, 115, 201, 207 and 215 represent relays. A winding 101-I of the relay 101 forms a part of a second detector described later and a winding 101-II forms first detector described later. A contact 115-2 of the relay 115 serves as switching means. Each of the relays 6 and 10 make up a third detector for detecting an incoming signal from the CO lines. Reference numeral 15 shows a 16 Hz multivibrator; 16 refers to sine-wave oscillator of about (400 to 1000) Hz; 14 indicates an amplifier; 27, 106 and 206 designate transformers, 106-1 and 206-1 identify primary windings of the transformers 106 and 206, respectively; and 106-2 and 206-2 denote secondary windings of the transformers 106 and 206, respectively. Reference numerals 11, 13, 23, 24, 25, 103, 104, 110, 112, 113, 204, 210, 212, 213, 42, 45, 47, 50 and 53 represent fixed resistors; 111, 211, 39, 40, 41 and 46 show diodes; 21, 22, 102, 108, 109, 202, 208, 209, 44, 49, 116 and 216 refer to transistors; 43 and 48 indicate light emission members such as luminescent diodes; 54 designates a speaker; 28 identifies a multivibrator of about ½ Hz; 105 and 205 denote coils, 26 and 36 represent constant-voltage diodes; and 17 and 18 show switching plates, which are each shown to be conducted between 0 and T by a connecting piece. Reference numerals 35-1 and 35-2 refer to hook switch contacts; 31-1, 31-2, 31-3, 31-4 and 32-1, 32-2, 32-3, 32-4 and 33-1, 33-2 indicate contacts of interlocked keys; 34-1 and 34-2 designate contacts of a push-button; 30 identifies a talking circuit of the key telephone set: 55, 56, 57, 58, 59 and 60 denote terminals for the key telephone sets; 61, 62, 63 and 64 represent terminals of two CO lines; 80 and 81 show DC power sources for producing two outputs which have respectively a certain positive potential difference and a certain negative potential difference with respect to a reference potential (in the illustrated example, the ground. The abovesaid outputs are shown to be positive and negative, but may be of the same polarity in some cases.); 70 and 71 refer to CO lines; 72 indicates an intercomm. line; 74 and 75 are control lines; and 73 identifies a common line which serves as one of a pair for each of the lines 72, 74 and 75. Reference numerals 100 and 200 denote control circuits having the same circuit construction. Reference numerals 6-1, 6-2 and 6-3 represent contacts of the relay 6; 10-1, 10-2 and 10-3 show contacts of the relay 10; 19-1 and 19-2 refer to contacts of the relay 19; 20-1 and 20-2 indicate contacts of the relay 20; 101-1 designates a contact of the relay 101; 107-1, 107-2 and 107-3 denote contacts of the relay 107; 207-1, 207-2 and 207-3 represent contacts of the relay 207; 115-1, 115-2, 115-3 and 115-4 identify contacts of the relay 115; and 215-1, 215-2, 215-3 and 215-4 represent contacts of the relay 215.

The operation of the key service unit 1 will hereinbelow be described. The present key service unit accomplishes the following fundamental functions: (1) reception of the incoming signal from the CO lines and its indication. (2) answer to the incoming signal from CO lines, talking operation and its indication, (3) calling for the CO line, (4) holding and its indication, (5) intercomm. calling, and (6) answer to the intercomm. calling and talking. The operations for performing the above functions will be described one after another. FIG. 1 shows an example of a circuit which employs two CO lines.

(1) Reception of the incoming signal from CO lines and its indication

When the CO lines are connected to the terminals 61 and 62 and an incoming signal (which is usually an AC signal of 16 Hz) is applied to one of them from an exchange in the central office, the incoming signal is rectified by the rectifier circuit composed of the diodes 5 and the capacitor 7, actuating the relay 6 (the third detector). With the operation of the relay 6, its contact 6-1 (first connecting means) is changed over to permit flowing of a DC in the route [power source ⊕→fixed resistors 103 and 104→contact 115-3→secondary winding 106-2 of transformer 106→contact 6-1→contact 115-2→control line 74→terminal 58→diode 40→luminescent diode 48→transistor 49→fixed resistor 50→terminal 59→common line 73→ground], thereby lighting the luminescent diode 48. Further, the connect 6-3 is turned ON so that the output from the oscillator 16, which serves as a first signal source for sending out a status signal indicative of the receiving status, is modulated by an output signal (about 16 Hz) of the multivibrator 15. The modulated output is applied through the contact 6-2 to the primary winding 106-1 of the transformer 106, and is induced in its secondary winding 106-2 and superimposed on the route in which the abovesaid DC flows. As a result of this, an AC flows in the route [secondary winding 106-2 of transformer 106→contact 6-1→contact 115-2→control line 74→terminal 58→diode 40→capacitor 52→push button switch contact 34-2→speaker 54→terminal 59→common line 73→ground (power source 81)→fixed resistor 103→fixed resistor 104→contact 115-3→winding 106-2], thus driving the speaker 54.

(2) Answer to the incoming signal from CO lines, talking operation and its indication.

Upon reception of the incoming signal from the CO line, the abovesaid operation takes place to light the luminescent diode 48 and, at the same time, a ringing tone is radiated from the speaker 54. In order to ensure flowing of a constant current in the luminescent diode 48 whenever it is energized, a constant-current circuit (a current limiting function) is constituted with the transistor 49, the fixed resistors 47 and 50 and the diode 46. Further, the operation level of this circuit is set by the fixed resistors 103 and 104 so that the base current of the transistor 102 may flow when the luminescent diode 48 is lighted, that is, when a current flows in the abovesaid constant-current circuit. This current has a current value (a second current value) sufficiently larger than a value required for the constant-current circuit. Moreover, no base current of the transistor flows by a voltage drop generated across the fixed resistor 103 with a first current value determined in consideration of the number of key telephone sets connected in parallel. A current detector (the second detector), which operates at a current exceeding a certain level, is formed of the transistor 102, the fixed resistors 103 and 104 and the primary winding I of the relay 101.

Next, upon hooking-OFF the handset of the called key telephone set (for example, 2) and pushing an interlocking key used for selecting a CO line, its contact is closed to flow a current in the base-emitter path of the transistor 102 through the route [power source ⊕→fixed resistor 103→fixed resistor 104→contact 115-3→secondary winding 106-2 of transformer 106→contact 6-1→contact 115-2→control line 74→terminal 58→contact 31-3→contact 32-3→hook switch contact 35-1→constant-voltage diode 36→contact 33-2→terminal 59→common line 73→ground E (the mid point between power sources ⊕ and ⊖]. At the same time, a DC flows in the route [power source ⊕→base-emitter path of transistor 102→fixed resistor 104→contact 115-3→secondary winding 106-2 of transformer 106→contact 6-1→contact 115-2→control line 74→terminal 58→contact 31-3→contact 32-3→hook switch contact 35-1→constant-voltage diode 36→contact 33-2→terminal 59→common line 73→ground E], turning ON the collector-emitter path of the transistor 102. As a result of this, a DC flows in the primary winding I of the relay 101 through the route [power source ⊕→collector-emitter path of transistor 102→primary winding I of relay 101→ground], actuating the relay 101. Upon actuation of the relay 101, a DC flows in the winding of the relay 115 through the route [power source ⊕→winding of relay 115→contact 101-1 of relay 101→ground E], actuating the relay 115. The capacitor 114 and the fixed resistor 113 serve to defer restoration of the relay 115. Upon the actuation of the relay 115, the contact 115-2 forming switching means is changed over to cut off the aforesaid incoming call loop starting with the secondary winding 106-2 of the transformer 106, but instead, a DC flows in the route [power source ⊕→fixed resistor 103→fixed resistor 104→coil 105→contact 115-2→(the route same as the aforementioned one in the case of answering)] and in the route [power source ⊕→base-emitter path of transistor 102 (and resistor 103)→fixed resistor 104→coil 105→contact 115-2→(the same route as the aforesaid one in the case of answering)]. At the same time, sending of the incoming signal to the key telephone sets 2 and 3 is stopped.

On the other hand, a DC flows in the luminescent diode 48 via the route [power source ⊕→base-emitter path of transistor 102 (and fixed resistor 103)→fixed resistor 104→coil 105→contact 115-2→control line 74→terminal 58→diode 40→luminescent diode 48→transistor 49→fixed resistor 50→terminal 59→common line 73→ground E)], indicating the CO line seizing status. That is, the signal source (a second signal source) in this status is the power source 81.

The abovesaid route from the power source ⊕ to the contact 115-2 forms second connecting means, and is used for connecting the power source 81 as the second signal source to the control line 74 in the period during which the output from the second detector exists (that is, when the contact 101-1 is switched by the operation of the relay 101 to actuate the relay 115 to change over the contact 115-2).

Accordingly, the visual indication by the luminescent diode 48 continues but the audible indication by the speaker 54 is stopped. Further, since the route actuating the aforesaid relay 6 is cut off by turning OFF of the contact 115-1, the relay 6 is restored.

In this case, it is preferred that the constant-voltage diode 36 (a circuit element for producing a voltage drop necessary for lightening of a light emission member) is usually set at a sufficiently small value (about ½ of the power source voltage) as compared with the power source voltage ⊕. The DC flowing in the luminescent diode 48 due to a voltage fluctuation caused by the voltage drop is held constant by the abovesaid constant-current circuit. This prevents brightness variations of the luminescent diode 48 during reception of the incoming signal, answering and talking. Further, by hooking OFF the handset and pushing the key, the aforesaid DC loop is formed and, at the same time, the talking circuit 30 of the called key telephone set is connected to the CO line through the route [terminal 61→CO line 70→terminal 55→contact 31-1 (switching means)-→talking circuit 30→contact 35-2 (switching means)-→terminal 56→CO line 70→terminal 62], thereby to enable the talking operation.

Now, a description will be given with regard to the function of decoupling means composed of the coil 105, a capacitor, etc. It is assumed that while one of the CO line is busy, an incoming call arrives at the other CO line, that is, while the control circuit 100 is occupied, the control circuit 200 is put in the state in which the incoming call arrives. In this case, since the two control circuits are respectively connected in parallel to the contact 34-2 through the capacitors 51 and 52, respectively, the fixed resistors 103 and 104, the transistor 102, the coil 105 and the contact 115-2 of the control circuit 100 operate in the same manner as described previously in connection with the control circuit 100. On the other hand, the ringing tone for the other CO line through the control circuit 200 is applied to the speaker 54 through the same route as the aforesaid incoming call route. Further, the ringing tone is also applied to the circuit composed of fixed resistors 103 and 104, the coil 105 and the contact 115-2 of the control circuit 100. This results in a loss of the ringing tone.

Then, it is preferred to alleviate the amount of such loss. To this end, such an arrangement is adopted that when the relay 115 operates to open its contact 115-3, the coil 105, which has a small DC resistance and increases the AC impedance, is inserted in series to the fixed resistor 104, thereby alleviating the loss of the ringing tone from the control circuit 200 when the control circuit 100 is in the talking state. Instead of using the coil 105, it is also possible to dispose echo preventing means such as a hybrid coil, an amplifier or the like at the connection point between the capacitors 51 and 52 and the contact 34-2. Further, it is also possible, of course, to prevent such crosstalk by using a plurality of speakers and arranging control lines individually.

(3) Calling for CO line

The above has described each operation in the reception of an incoming signal. Now, a calling operation for the CO line will be described. During waiting (when neither an incoming signal nor a calling operation exists), a negative power source voltage appears at the terminal 58 via the route [power source ⊖→secondary winding II of relay 101→contact 107-1→contact 20-1→contact 6-1→contact 115-2→control line 74→terminal 58]. At this time, however, the diode 40 exists between the terminals 58 and 59 and the contacts 31-3 and 35-1 are in their OFF state, so that no current flows. In this case, upon hooking OFF the handset of the key telephone set 2, the hook switch contact 35-1 makes, and then upon pushing the CO line selecting key 31, the key contact 31-3 makes (to provide controlling means having ON-OFF switch element) to flow a current in the secondary winding II of the relay 101 (the first detector) through the route [ground E→common line 73→terminal 59→contact 33-2→constant-voltage diode 36→contact 35-1→contact 32-3→contact 31-3→terminal 58→control line 74→contact 115-2→contact 6-1→contact 20-1→contact 107-1→secondary winding II of relay 101→power source ⊖], actuating the relay 101. Upon actuation of the relay 101, its contact 101-1 is changed over to actuate the relay 115. Thereafter, the same operations as those in the case of answering to the incoming call take place to connect the called key telephone set to the CO line to enable the talking operation.

The foregoing description has been made in connection with the case where a luminescent diode or like light emission member is lightened by the use of a DC power source, but it is also possible to lighten the light emission member by using an AC power source.

(4) Holding and its indication

Next, the operation of holding the CO line will be described. Assuming that the loop of the CO line 70 is in its talking state in answer to an incoming call from the CO line, a DC loop is formed in the control line 74 and the common line 73 through the route [power source ⊕→fixed resistor 103→fixed resistor 104→coil 105→contact 115-2→control line 74→terminal 58→contact 31-3→contact 32-3→hook switch contact 35-1→constant-voltage diode 36→contact 33-2→terminal 59→common line 73→ground]. By a voltage drop across the constant-voltage diode 36 produced by the DC loop, the capacitor 37 connected in parallel with the constant-voltage diode 36 and the capacitor 38 connected in parallel therewith through the contacts 33-1 and 33-2 are respectively charged.

Next, when the operator presses the CO line holding key prepared for holding, its contacts 33-1 and 33-2 (charging voltage applying means) are changed over and, at this time, the voltage charged in the capacitors 37 and 38 (i.e. a capacitor circuit) is applied across the terminals 58 and 59 through the route [terminal 58→contact 31-3→contact 32-3→hook switch contact 35-1→capacitor 37→contact 33-1→capacitor 38→terminal 59]. In this case, the operating voltage level of the constant-voltage diode 36 is set at a value a little higher than half the voltage of the power source ⊕. For instance, if the voltage of the source ⊕ is 24 volts, the voltage level of the constant-voltage diode 36 is set at 13 volts, in which case a voltage of 26 volts is instantaneously applied across the terminals 58 and 59 in the abovesaid state. That is, by the voltage instantaneously generated across the terminals 58 and 59, the potential difference of the power source 81 inserted in the aforesaid DC loop through the control line 74 is cancelled, so that the current flowing in the DC loop is reduced or cut off to assume a third current value. Accordingly, this reduces the potential difference produced across the fixed resistor 103, or inverts the polarity of the potential difference.

As a result of this, the fixed resistor 103 is reversely biased to reduce or cut off the base current of the transistor 102, so that its collector current is also cut off and the relay 101 is restored. On the other hand, since the collector current of the transistor 108 (the fourth detector) is also cut off and since the fixed resistor 103 and 104 (detecting resistors) are reversely biased, the base current of the transistor 109 is cut off, turning OFF its collector-emitter path. As a result of this, the base current of the transistor 108 is applied from the power source ⊖ through the contact 115-4 and the fixed resistor 112, turning ON the collector-emitter path of the transistor 108. At this time, the relay 101 is restored, and the relay 115 (a first relay) is delayed by the capacitor 114 to be restored, so that at the instant when the relay 101 is restored while the transistor 108 is in the ON state, a current flows in the relay 107 (a second relay) through the route [power source ⊕→contact 115-4 of relay 115→emitter-collector path of transistor 108→relay 107→contact 101-1 of relay 101→ground E], actuating the relay 107. The operation of the relay 107 is self-held by its own contact 107-3 to form a loop [terminal 61→fixed resistor 12→contact 107-2 of relay 107→terminal 62] across the terminals 61 and 62 to which the CO line connected. Consequently, the CO line is held.

Further, by the operation of the contact 107-1, the transistor 116, to the base of which is applied an output signal from the multivibrator 28 continuously oscillating at a frequency of about ½ Hz, is turned ON and OFF through the following loop and the ON-OFF signal is delivered out as lamp indication information of holding. The abovesaid loop is as follows: [power source ⊕→fixed resistor 103→fixed resistor 104→contact 115-

3→emitter-collector path of transistor 116→contact 107-1→contact 20-1→contact 6-1→contact 115-2→control line 74→terminal 58→diode 40→luminescent diode 48→collector-emitter path of transistor 49→fixed collector 50→terminal 59→common line 73→ground E]. Accordingly, a lamp display of holding, which is sufficiently distinguished from the lamp indication of the incoming signal, is provided.

On the other hand, the CO line selecting key 31 operated during the talking operation is restored and its contacts 31-1 and 31-2 are switched to disconnect the talking circuit 30 from the CO line 70. The contact 31-3 is also restored. The state of the key service unit 1 at this time is the same as the aforementioned one during the waiting state except that the relay 107 is in its actuated state.

Next, in order to release the holding state and enable the key telephone set 2 to seize the CO line again, it is sufficient only to take up the handset of the key telephone set 2 and press the CO line selecting key 31 in the same manner as the calling button, described previously. That is, the contacts 31-1, 31-2 and 31-3 and the hook switch contacts 35-1 and 35-2 make. As a result of this, a DC flows in the emitter-base path of the transistor 102 through the route [power source ⊕→emitter-base path of transistor 102→fixed resistor 104→coil 105 (and contact 115-3)→emitter-collector path of transistor 116 (at this time, an interrupted signal of about ½ Hz is applied from the multivibrator 28 to the base-emitter path of the transistor 116 so that its emitter-collector path is also repeatedly turned ON and OFF in synchronism with the interrupted signal.)→contact 107-1→contact 20-1→contact 6-1→contact 115-2→contact line 74→terminal 58→contact 31-3→contact 32-3→contact 35-1→constant-voltage diode 36→contact 33-2→terminal 59→common line 73→ground E], turning ON the collector-emitter path of the transistor 102. At this time, a DC flows in the route [power source ⊕→emitter-collector path of transistor 102→primary winding I of relay 101→ground E] to actuate the relay 101, and the self-supporting route [power source ⊕→contact 107-3→relay 107→contact 101-1→ground E] of the relay 107 is cut off by switching the contact 101-1, restoring the relay 107. The above is the operation of the holding circuit. For completing the circuit operation, the following conditions are necessary.

(a) The CO line selecting key 31 and the CO line holding key 33 are required to satisfy the following conditions: (1) The CO line selecting key 31 is a lock key and restored when the CO line holding key 33 is restored after pressed. (2) Accordingly, the contact 31-3 remains in its ON state when the CO line holding key 33 is in its pressed position and, at this time, the contacts 33-1 and 33-2 of the CO line holding key 33 are change over. (3) Upon restoration of the CO line holding key 33, the CO line selecting key 31 is also restored and the contact 31-3 also breaks, or when the CO line holding key 33 is depressed, its contacts 33-1 and 33-2 are restored after a certain period of time. The mechanical structures of these interlocking keys have already been employed in many kinds of key telephone sets and well-known, and hence will not be described herein.

(b) The relay 101 and the transistor 108 are restored more quickly than the relay 115.

(c) The operating current level $I_C$ flowing in the control line 74 through the detector of the relay 101, that is, the fixed resistor 104, is set in the range given by the following formula:

$$I_H < NI_O < I_C < I_L$$

where notation $I_O$ is a required current across the terminals 58 and 59 when the contacts 31-1, 32-3 and 35-1 are OFF-states and the voltage ⊕ is applied to the terminal 58; $I_L$ is a required current across the terminals 58 and 59 when the contacts 31-3, 32-3 and 35-1 are ON-states and the voltage ⊕ is applied to the terminal 58; N is the number of telephone sets connected; and $I_H$ is the operating current level flowing in the control line when the transistor 108 is turned ON and OFF.

(5) Intercomm. calling operation

In the case of performing an intercomm. calling operation, the control line 74 or 75 is used as the route for sending out the ringing tone for driving the speakers 54 from the key service unit 1 to the key telephone sets 2 and 3, and the intercomm. line 72 is used as the route for transmitting instructions to make send the key service unit 1 the abovesaid ringing tone. The operation will hereunder be described.

In the case of performing an intercomm. calling operation from the key telephone set 2 to the telephone set 3, upon hooking-OFF the handset of the telephone set 2, the hook switch contact 35-2 makes to apply a DC, i.e. a talking current, to the talking circuit 30 through the route [power source ⊕→fixed resistor 25→winding (lower) of transformer 27→intercomm. line 72→terminal 57→contact 34-1 of intercomm. calling key 34 (means for inserting a resistor at the time of intercomm. calling operation)→contact 32-1→contact 31-1→talking circuit 30→hook switch contact 35-2→contact 31-2→contact 32-2→terminal 59→common line 73→ground], enabling the talking operation. In this case, the circuit formed by the constant-voltage diode 26 connected to the fixed resistor 25, the fixed resistor 23, the transistor 21 and the relay 19, and the circuit formed by the fixed resistor 24, the transistor 22 and the relay 20, are respectively a first current detector and a second current detector (intercomm. calling detectors) for intercomm. calling. The operation point of the first intercomm. calling current detector is set so that it may operate when the DC supplied through the abovesaid route, whose magnitude is not so large as not to hinder the talking operation, for example, a current of 20 mA or more, flows in the talking circuit 30, that is, the intercomm. line 72. Moreover the operating point of the second intercomm. calling current detector is set so that it may operate when the fixed resistor 53 is inserted in series in the aforesaid route and the current flowing in the talking circuit 30 is sufficiently smaller than the abovesaid current, for example, more than 5 mA.

Upon actuation of the intercomm. calling key 34 disposed in the key telephone set 2 for calling the telephone set 3, the contact 34-1 breaks, so that the series resistor 53 is inserted in the aforementioned loop to abruptly decrease the current flowing in the loop. As a result of this, the first intercomm. calling current detector becomes inoperative and the relay 19 is restored. However, since the second intercomm. calling current detector continues its actuated state, the output signal from the oscillator 16 is applied through the following route to the speakers 54 of the key telephone sets 2 and 3 to energize them. In other words, the output signal from the oscillator 16 (the ringing source) enters in the control circuit 100 corresponding to the key telephone set 2 and flows in the route [output terminal of oscillator 16→terminal T of switch 18→terminal O of switch 18→primary winding 106-1 of transformer 106→ground] to energize the transformer 106 to induce a signal in its secondary winding. Then, this induced signal causes a signal current in the loop [secondary winding 106-2 of transformer 106→contact 19-1 of relay 19 (third connecting means)→contact 20-1 of relay 20 (third connecting means)→contact 6-1 of relay 6→contact 115-2 of relay 115→control line 74→terminal 58→diode 40→capacitor 52→contact 34-3→speaker 54→terminal 59→common line 73→ground→power source 81→fixed resistor 103→fixed resistor 104→contact 115-3→secondary winding 106-2 transformer 106], thereby energizing the speaker 54. At this time, the speaker 54 of the key telephone set 2 which is the intercomm. calling telephone set, is cut off at the contact 34-2, and hence is not energized, and only the speaker 54 of the called key telephone set 3 is energized.

The above has described for the intercomm. calling operation through the control circuit 100, but a calling loop is also formed through the loop of the control circuit 200. Namely, by the intercomm. calling operation, the contact 20-1 of the relay 20 is actuated to perform an intercomm. calling through the loop of the control circuit 100. On the other hand, the output signal from the oscillator 16 enters in the control circuit 200 corresponding to the key telephone set 3 and flows in the route [output terminal of oscillator 16→terminal T of switch 18→terminal O of switch 18→primary winding 206-1 of transformer 206→ground] to energize the transformer 206 to induce a signal in its secondary winding. Then, the induced signal causes a signal current in the route [secondary winding 206-2 of transformer 206→contact 19-2 of relay 19→contact 20-2 of relay 20→contact 10-1 of relay 10→contact 215-2 of relay 215→control line 75→terminal 60→diode 39→capacitor 51→contact 34-2→speaker 54→terminal 59→common line 73→ground E→power source 81→fixed resistor 203→fixed resistor 204→contact 215-3→secondary winding 206-2 of transformer 206], thus energizing the speaker 54 of the key telephone set 3 at the same time as the operation by the control circuit 100.

The reason for requiring the simultaneous operation of the intercomm. calling circuits will be hereinbelow be described. This is to enable that even when one of the two CO lines is established in the incoming call receiving state or in the state of talking operation of the CO line, the other may perform an intercomm. calling operation. Namely, when the control circuit 100 is established in the communicating state for the CO line, the contact 115-2 of the relay 115 is switched, so that the aforesaid intercomm. calling loop of the control circuit 100 is cut off. In the control circuit 200, however, since the contact 215-2 is in its closed state, the intercomm. calling operation is performed through the loop. Thus, the intercomm. calling operation takes place through the loop of each of the control circuits 100 and 200.

In case of energizing the speaker 54, a DC bias is applied to the transistor 49 through the route [power source ⊕→fixed resistor 103→fixed resistor 104→contact 115-3→contact 115-2→control line 74→terminal 58→diode 40→luminescent diode 48→collector-emitter path of transistor 49→fixed resistor 50→terminal 59→common line 73→ground→power source 81] to raise the AC impedance of the transistor 49. It is also possible to insert an inductive element such as a coil or the like in parallel with the transistor 49 instead of applying the DC bias to the transistor 49 through the abovesaid route.

(6) Answer to intercomm. calling and talking operation

Upon hooking OFF the handset of the key telephone set 3 in the abovesaid state, that is, in the called state, the talking circuit 30 of the key telephone set 2 (In this case, the series resistor 53 is inserted in the talking circuit 30 to provide a high resistance value) and the talking circuit 30 of the key telephone set 3 (In this case, since the abovesaid resistor 53 is not inserted in the talking circuit 30, the resistance value is low.) are connected in parallel in the abovesaid loop and the composite resistance is low, so that the current flowing in the intercomm. line 72 increases to actuate the relay 19. As a result of this, the contact 19-1 is changed over to cut off the ringing loop energizing the aforesaid speaker 54 and accordingly the ringing tone, thereby to stop the calling operation.

Further, the calling operation is stopped not only when the called party answers as described above, but also when the calling party gives up the calling operation, namely, when the contact 34-1 makes, the operation described above takes place to stop calling.

Moreover, when the calling party hookes ON the handset, the abovesaid calling route is cut off by the contact 20-1 to stop the calling operation.

In a case where the key telephone sets 2 and 3 thus connected to each other perform the intercommunication operation, direct currents are respectively supplied to the talking circuits 30 of the key telephone sets 2 and 3 through the route [power source ⊕→fixed resistor 25→winding of transformer 27→intercomm. line 72→contact 34-1 of key telephone set 2→contact 32-1→contact 31-1→talking circuit 30 of key telephone set 2→hook switch 35-2 of key telephone set 2→contact 31-2→contact 32-2→terminal 59→common line 73→ground] and the route [power source ⊕→fixed resistor 25→winding of transformer 27→intercomm. line 72→contact 34-1 of key telephone set 3→talking circuit 30 of key telephone set 3→hook switch 35-2 of key telephone set 3→contact 31-2 of key telephone set 3→contact 32-2 key telephone set 3→terminal 59 of key telephone set 3→common line 73→ground], enabling the intercommunication operation.

In case of starting a call for the CO line during the intercomm. calling operation, the key 31 is pressed to accomplish the operation through the following route. Namely, a direct current flows in the route [power source ⊕→emitter-base path of transistor 102 (and fixed resistor 103)→fixed resistor 104→contact 115-3→secondary winding 106-2 of transformer 106→contact 19-1→contact 20-1→contact 6-1→contact 115-2→control line 74→terminal 58→contact 31-3→contact 32-3→contact 35-1→constant-voltage diode 36→contact 33-2→terminal 59→common line 73→ground E] to flow the base current of the transistor 102 to turn ON its collector-emitter path. As a result of this, the relay 101 is actuated and, by the switch operation of its contact 101-1, the relay 115 is actuated to turn OFF its contact 115-2, cutting off the aforesaid intercomm. calling route. Namely, the contacts 115-2 and 215-2 are provide as a plurality of fourth connecting means corresponding to the control lines, each of which means is coupled with a corresponding one of the aforementioned plurality of third connecting means (19-1, 20-1, . . . ) by which, in the aforesaid intercomm. calling state, the signal source 16 and the second detector (including the winding I of the relay 101) are connected to a corresponding one (74) of the plurality of control lines, and by which, when a corresponding one of the plurality of detectors derives therefrom an output, only the ringing tone source 16 is disconnected from the abovesaid control line in response to the output.

The above has described for the intercomm. calling operation in connection with the tone calling operation but this invention enables a voice calling operation. The operation therefore will hereinbelow be described. The changeover terminals 17 and 18 are switched to interconnect the terminals O and V. As a result of this, the output of the amplifier 14 is connected to the primary winding 106-1 of the transformer 106. Further, the input of the amplifier 14 is connected to the winding (upper) of the transformer 27 to flow a voice signal current from the talking circuit 30 in the same loop as that for supplying a direct current to the talking circuit 30. The voice signal current is induced in the winding (lower) of the transformer 27 and applied to the amplifier 14, so that the output from which is applied through the transformer 106 to the speaker 54 in the same loop as the tone signal sending loop, thus enabling the voice calling operation.

Figure 2B:
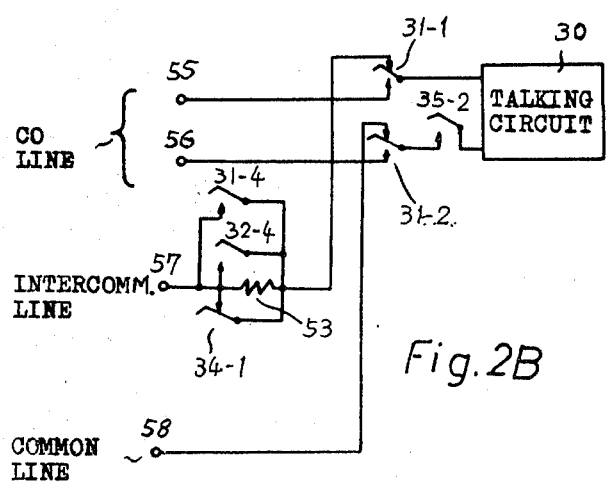

Further, FIG. 1 shows the case of employing two CO lines, but the present invention is also applicable to the case of one CO line. In such a case, only the circuit composed of the relay 6, the diodes 5, the capacitors 4 and 7 and the fixed resistor 12, connected to the terminal 61, is retained, while the circuit composed of the diodes 9, the relay 10, the capacitors 8 and 11 and the fixed resistor 13, connected to the terminal 63, is not necessary. Moreover, since the relay 10 is left out, each break contact part remains a through connection line and each make contact part remains the OFF-state in the circuit portion using the contacts of the relay. Specifically, the multivibrator 15 and the oscillator 16 are connected in parallel with each other and the output side of the circuit 16 is connected as shown in FIG. 2A. Further, one control line is used and the control circuit connected thereto is only the circuit 100, while the circuit 200 is not needed. The CO line selecting key provided in the telephone set is also one, whose connection is shown in FIG. 2B. Moreover, the current limiting circuit including the luminescent diode and the speaker connection circuit, that is, only the circuit composed of the luminescent diode 48, the transistor 49, fixed resistors 47 and 50, the diodes 40 and 46 and the capacitor 52 is retained, while the diodes 39 and 41, the capacitor 51, the luminescent diode 43, the transistor 44 and the fixed resistors 42 and 45 in FIG. 1 become unnecessary.

Figure 3A:
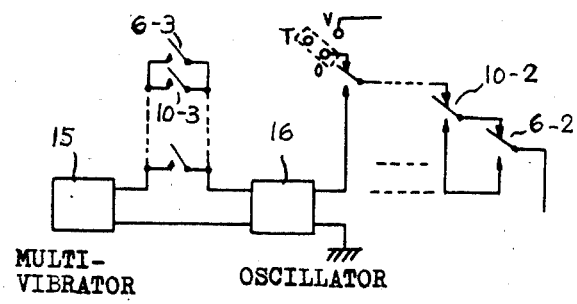

FIG. 1 and FIGS. 2A and 2B illustrate the cases of using two CO lines and one CO line, respectively, but this invention is also applicable to the case of employing more CO lines. In such a case, the number of the circuits corresponding to the circuit which is formed of the relay 6, the diodes 5, the capacitors 4 and 7 and the fixed resistor 12, connected to the CO lines, i.e. the terminals 61 and 62, must be increased (two circuits in FIG. 1) corresponding to the number of CO lines used. Further, since a plurality of circuits corresponding to the relay 6 are used, a required number of circuit portions using their contacts are connected in parallel or in series. In concrete terms, the multivibrator 15 and the oscillator 16 are connected in parallel to each other, and the output side of the circuit 16 is connected as shown in FIG. 3A.

The number of control lines is also increased in correspondence to the number of CO lines, and the number of control circuits 100 and 200 connected to the control lines are also increased so that they are respectively connected to the corresponding ones of the control lines 74 and 75. The other connections are parallel configurations.

Figure 3B:
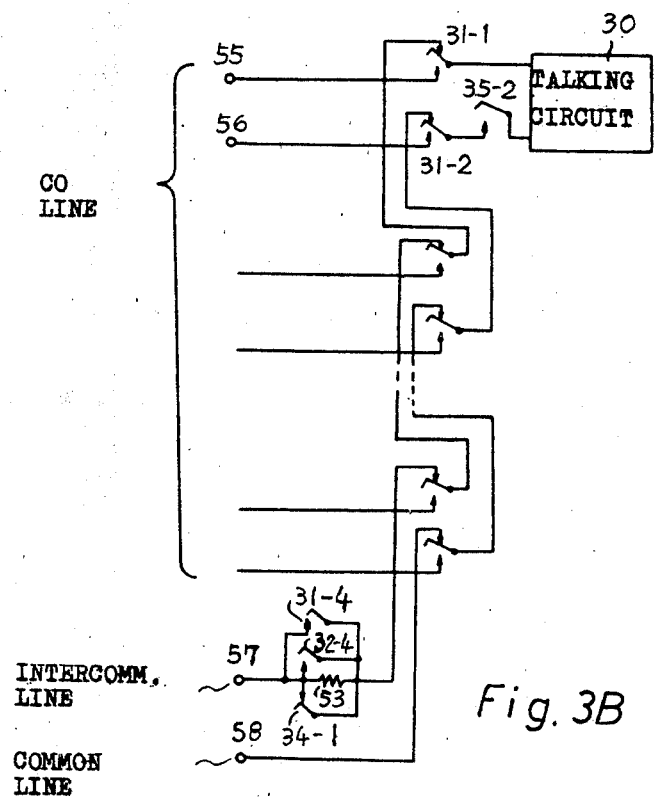

Moreover, the number of CO line selecting keys provided in each key telephone set are also increased in correspondence to the number of CO lines employed and their connections are the so-called chain circuit connections, as exemplified in FIG. 3B.

Furthermore, the number of current limiting circuits and speaker connection circuits including luminescent diodes, that is, the circuits composed of the luminescent diode 48, the transistor 49, the fixed resistors 47 and 50, the diodes 40 and 46 and the capacitor 52, are also increased in corresponding to the number of CO lines. The abovesaid circuits are each connected at the left-hand end to the control line and at the right-hand end to the speaker 54.

As has been described in the foregoing, the present invention enables the main functions of the key telephone system, i.e. reception of an incoming call from the CO line, indication, answer and originating of a call, with the use of a cable having an extremely small number of conductors as compared with that needed in the prior art system. This provides remarked effects in practice such as curtailment of the costs of cable and construction and reduction of space required.

Figure 4:
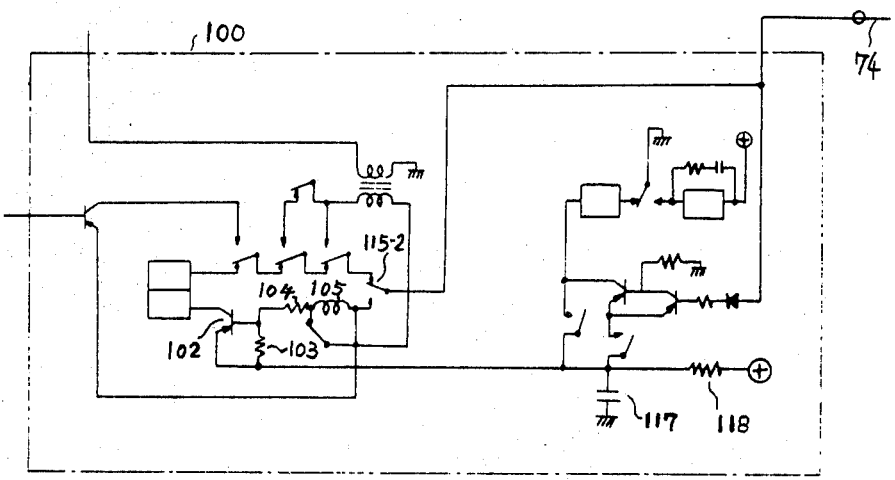
Figure 5:
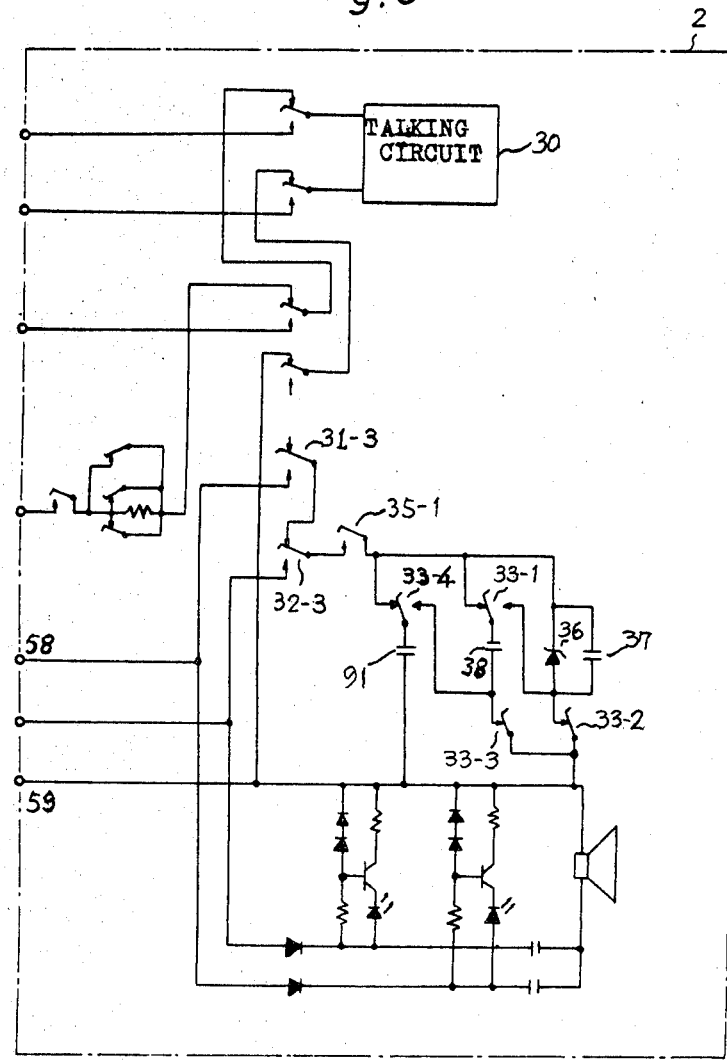

FIGS. 4 and 5 show examples of a circuit in which the value of voltage generated from a telephone set upon actuation of the holding key for further stabilizing the operation of the holding circuit is sufficiently larger than the value of a voltage applied to the control line from the key service unit at that time.

The example shown in FIG. 4 is a circuit which adds a circuit of a fixed resistor 118 and a capacitor 117 to the circuit of FIG. 1, and in which when the contact 115-2 is in the ON state, the power source voltage including a voltage drop caused across the fixed resistor 118 by a loop current flowing through the contact 115-2 is charged in the capacitor 117. Namely, the terminal voltage of the capacitor 117 has a value lower than the voltage value of the power source ⊕ by the voltage drop across the fixed resistor 118. The voltage, which is applied to the fourth detector by the voltage generated from the telephone set 2 or 3 by switching of contacts 33-1 and 33-2 under the abovesaid condition, increases by an amount corresponding to the voltage drop, as compared with the voltage in FIG. 1, thereby ensuring the operation of the fourth detector. This is a circuit having the function of decreasing the aforesaid voltage drop.

The example of FIG. 4 achieves stable detection by dropping the voltage applied from the key service unit 1, but the example of FIG. 5 enables the same effect by raising the voltage generated from the telephone set 2. FIG. 5 illustrates the structure of increasing the number of capacitors used although the example of FIG. 1 achieves voltage generation from the capacitors 37 and 38. The number of capacitors 91 in FIG. 5 is three but may be increased to four more as desired. Further, the combined use of the structures of FIGS. 4 and 5 is of course possible.

In the following, another example of this invention using calling signals of individually predetermined different frequencies will be described below.

Figure 6:
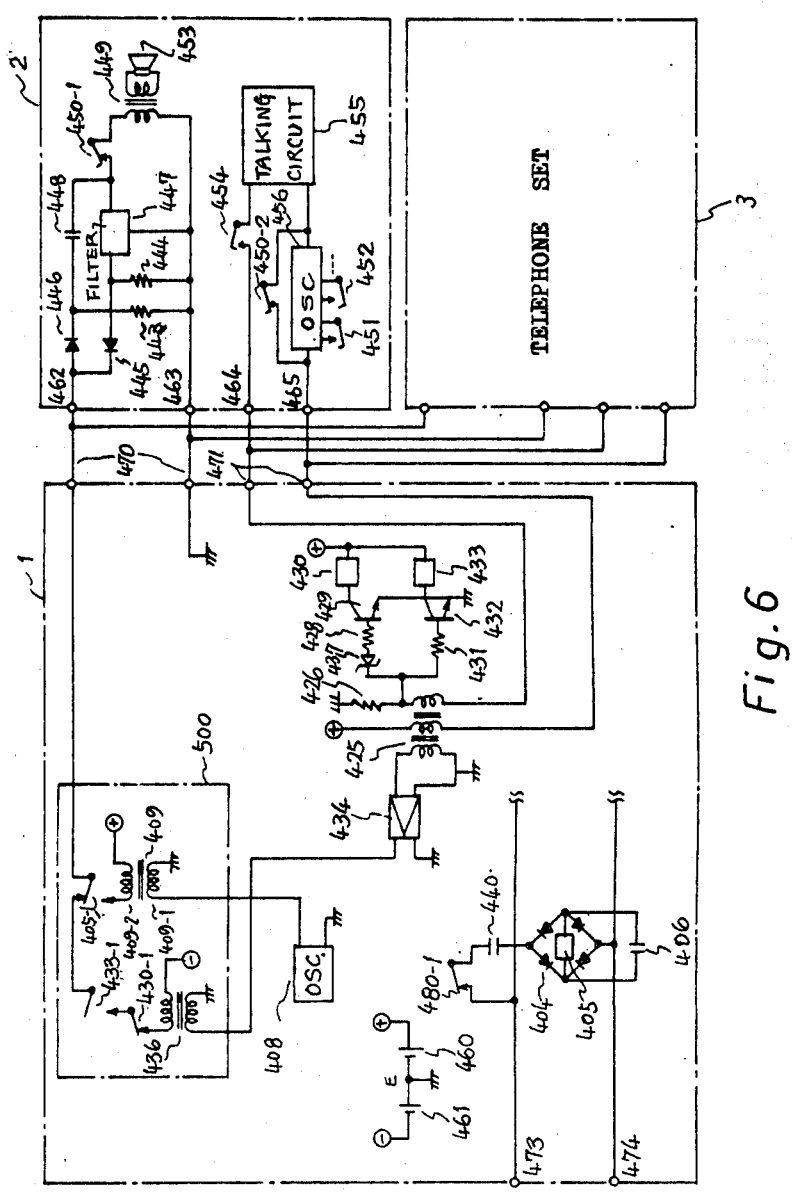
FIG. 6 is a circuit diagram illustrating another embodiment of this invention.

In FIG. 6, reference numeral 1 indicates a key service unit of this invention; 2 and 3 designate key telephone sets of the same circuit construction, the circuit construction of only the key telephone set 2 being shown; 404 identifies four diodes which make up a rectifier; 406, 440 and 448 denote capacitors; 405, 430 and 433 represent relays; 405-1, 430-1 and 433-1 shows relay contacts of numerals respectively corresponding thereto; 408 refers to an oscillator for the tone ringer; 434 indicates an amplifier; 409, 425, 436 and 449 designate transformers; 426, 428, 431, 443 and 444 identify fixed resistors; 445 and 446 denote diodes serving as switching means; 427 represents a constant-voltage diode; 429 and 432 shows transistors; 447 refers to a filter (which is described to be a band-pass filter in this embodiment, but may be a low-pass filter or a high-pass filter in some cases.); 456 indicates an individual ringing oscillator; 455 designates a talking circuit; 454 identifies a hook switch contact; 451 and 452 denote contacts of individual intercomm. calling keys; 450-1 and 450-2 represent contacts which respectively operate in association with the contacts 451 or 452 when the abovesaid individual intercomm. calling keys are pressed; 453 refers to a speaker; 462, 463, 464 and 465 indicate terminals; 470 designates control lines; 471 identifies talking lines; and 473 and 474 denote CO line input terminals. In FIG. 6, CO line keys and other circuit elements are not shown for simple illustration.

(1) Intercomm. calling operation

In the case of achieving an intercomm. calling operation, the control line 470 is employed as a route through which a calling signal for driving a speaker 453 is sent from the key service unit 1 to each of the key telephone sets 1 and 2, and the intercomm. talking line 71 (hereinafter referred to as the talking line) is used as a route through which instructions are given to the key service unit 1 from each of the key telephone sets 2 and 3 for sending out the abovesaid speaker driving calling signal.

In the case of achieving an intercomm. calling operation from the key telephone set 2 to the key telephone set 3 in FIG. 6, upon hooking OFF the handset of the key telephone set 2, the hook switch contact 554 makes to form a talking loop [power source ⊕→winding (intermediate) of transformer 425→talking line 471→terminal 465→contact 450-2 of individual intercomm. calling key→talking circuit 455→hook switch contact 454→terminal 464→talking line 471→winding (right-hand) of transformer 425→fixed resistor 426→ground E], through which direct current is supplied to the talking circuit 455 to enable the talking operation. The circuit formed of the constant-voltage diode 427, the fixed resistor 428, the transistor 429 and the relay 430, and the circuit formed of the fixed resistor 431, the transistor 432 and the relay 433, both connected to the fixed resistor 426, are first and second current detectors, respectively. The first detector has its operating point set so that it operates when the direct current supplied through the abovesaid route has such a current value as not to interfere with the talking operation, for instance, larger than 20 mA, flows in the talking circuit 455, that is, the talking lines 471. The operating point of the second detector is set such that the detector operates when the oscillator 451 is inserted in series in the above route and the current flowing in the talking circuit 455 has a value sufficiently smaller than the abovesaid value, for example, larger than 5 mA. Accordingly, in the off-hook state, since voltages are applied from the talking line 471 to the bases of the transistors 429 and 432, the first current detector and second current detector both become operative. The first current detector and the second current detector form a detector for detecting the intercomm. calling state. The DC resistance value of the oscillator is set at a value sufficiently larger than that of the talking circuit, for instance, about 1KΩ.

Now, upon actuation of the intercomm. calling key provided in the key telephone unit 2 for calling the telephone set 3, the contact 450-2 breaks as mentioned above, with the result that the oscillator 456 is inserted in the aforesaid loop to abruptly decrease the current flowing in the loop. As a result of this, the first detector becomes inoperative and the relay 430 is restored. However, the second detector continues its operation.

The oscillator 456 is so constructed as to oscillate at individual frequencies (voice frequencies) by making of any one of the contacts 451, 452, . . . of the intercomm. calling keys at the time of the intercomm. calling operation. Since this circuit are already embodied as a push-button dial and the like, the details of the circuit will not be described. Then, when one of the individual intercomm. calling keys is pressed, the contact 451 or 452, . . . makes and, at the same time, the contact 450-2 breaks to supply direct current to the oscillator 456 through the abovesaid loop. As a result of this, the oscillator oscillates at a frequency predetermined corresponding to the pressed key to flow an individual frequency signal from the oscillator 456 in the loop [output terminal (left-hand) of the oscillator 456→terminal 465→talking line 471→winding (intermediate) of transformer 425→power source 460 ⊕→ground E→fixed resistor 426→winding (right-hand) of transformer 425→talking line 471→terminal 464→hook switch contact 454→talking circuit 455→output terminal (right-hand) of oscillator 56] to excite the transformer 425 to induce the abovesaid frequency signal in its winding (left-hand). The induced signal is amplified by the amplifier 434 and applied to the winding (lower) of the transformer 436 to be induced in its winding (upper). The abovesaid means and the contacts 430-1, 433-1 and 405-1 are means for transmitting the output from the oscillator 456 to the control line 470.

When the individual intercomm. calling key is in its pressed position, the relay 433 operates and its contact 433-1 is in the ON state. Accordingly, a direct current flows in the diode 445 serving as switching means of each of the key telephone sets 2 and 3 through the loop (first applying means) [ground E→control line 470→terminal 463→fixed resistor 444→diode 445→terminal 462→contact 405-1→contact 433-1→contact 430-1→winding (upper) of transformer 436→power source ⊕], thereby reducing the AC impedance of the diode 445. At this time, the other diode 446 acting as switching means is reversely biased by an amount corresponding to a voltage drop across the fixed resistor 444 and its AC impedance is maintained high. That is, the circuits of the key telephone sets 2 and 3 perform the same operation.

Next, a description will be given with regard to the route in which individual frequency signals flows from the oscillator 456. As described above, when the individual intercomm. calling key is pressed, the current of the frequency signal from the oscillator 456, induced in the transformer 436, flows in the loop [winding (upper) of transformer 436→contact 430-1 of relay 430→contact 433-1 of relay 433→contact 405-1 of relay 405→control line 470→terminal 462 of key telephone set 3→diode 445 of key telephone set 3→filter 447 of key telephone set 3→contact 450-1 of key telephone set 3→winding (left-hand) of transformer 449 of key telephone set 3→terminal 463 of key telephone set 3→control line 470→ground E→power source 461] and the signal current is induced in the winding (right-hand) of the transformer of the key telephone set 3, energizing the speaker of the key telephone set 3.

That is, the pass band of the filter (a band-pass filter) 447 of the key telephone set 3 is so selected as to permit the passage therethrough of only the frequency signal of the oscillator 456 of the key telephone set 2 having oscillated at that time (the oscillator 56 is so designed as to oscillate at several kinds of frequencies selected by selective actuation of the individual intercomm. calling keys), by which the individual intercomm. calling operation is achieved. In the key telephone set 2, since the filter 447 does not permit the passage therethrough of the abovesaid frequency signal and since the individual intercomm. calling key of its own is pressed, the contact 450-1 is opened to keep the speaker 453 deenergized.

At this time, in a kay telephone set (not shown in FIG. 6) connected in parallel with the key telephone sets 2 and 3, the abovesaid call signal is inhibited by the filter 447 of the key telephone set and its speaker is not energized. In this manner, the filter 447 of each key telephone set is provided corresponding to the individual intercomm. calling key so that it may pass therethrough the particular frequency signal predetermined for calling the key telephone set.

Further, in the loop [terminal 462→diode 446→capacitor 448→contact 540-1→winding (left-hand) of transformer 449→terminal 463], the AC impedance of the diode 446 is retained high as described above, so that the frequency signal (the call signal) is blocked by the diode.

(2) Answer to intercomm. calling and talking operation

When the handset of the key telephone set 3 is hooked OFF in the abovesaid condition, that is, in its called state the talking circuit 455 of the key telephone set 3 (in this case, the oscillator 456 is inserted and the resistance of the circuit is high.) and the talking circuit of the key telephone set 3 (in this case, the oscillator 456 is not inserted, and the resistance of the talking circuit 455 is low.) in the abovesaid loop are connected in parallel with each other and their composite resistance is low, so that the current in the talking line 471 increases to actuate the relay 430. As a result of this, the contact 430-1 is changed over to cut off the call signal loop energizing the speaker 453, and consequently the frequency signal (call signal) is cut off, thus stopping the call.

Further, the call is stopped not only when the called party answers as described above, but also when the calling party abandons the call, that is, when the contact 450-2 makes, the same operation as mentioned above takes place to stop the call.

Moreover, when the calling party hookes ON the handset, the abovesaid calling route is cut off and the calling operation is stopped.

The above is the intercomm. calling operation. In a case where the key telephone sets 2 and 3 thus connected to each other achieve an intercomm. talking operation, direct currents are supplied to the talking circuits of the key telephone sets 2 and 3 respectively through the route [power source ⊕→winding (intermediate) of transformer 425→talking line 471→terminal 465 of key telephone set 2→contact 450-2 of key telephone set 2→talking circuit 455 of key telephone set 2→hook switch contact 454 of key telephone set 2→terminal 464 of key telephone set 2→talking line 471→winding (right-hand) of transformer 425→fixed resistor 426→ground E] and the route [power source ⊕→winding (intermediate) of transformer 425→talking line 471→terminal 465 of key telephone set 3→contact 450-2 of key telephone set 3→talking circuit 455 of key telephone set 3→hook switch contact 454 of key telephone set 3→terminal 464 of key telephone set 3→talking line 471→winding (right-hand) of transformer 425→fixed resistor 426→ground E], thus enabling the intercomm. talking operation.

(3) Incoming calling from CO line

The above has described the intercomm. calling operation, and the following will describe for the operation in the case of arriving an incoming calling signal from the CO line.

In FIG. 6, when an incoming calling signal (usually an AC voltage of 16 Hz) is applied to the CO line input terminals 773 and 774, the relay 405 operates. By switching of its contact 505-1, the output signal from the oscillator 408, which is always in its oscillating state, flows in the following loop through the transformer 409 to energize the speaker 453. At first, a direct current flows in the diode 446 through the route [power source ⊕→winding 409-2 of transformer 409→control line 470→terminal 462→diode 446→fixed resistor 443→terminal 463→control line 470→ground E] (second applying means), thereby to lower the AC impedance of the diode 446. Accordingly, the AC signal current from the oscillator 408 to the speaker 453 flows in the loop [winding 409-2 of transformer 409→contact 405-1→control line 470→terminal 462→diode 446→capacitor 448 (by-pass means)→contact 450-1→winding (left-hand) of transformer 449→terminal 463→control line 470→ground E→power source 60] to excite the transformer 449, and the induced voltage in its winding (right-hand) is applied to the speaker 453 to energize it.

At this time, the diode 445 is reversely biased by a voltage drop across the fixed resistor 443 to raise its AC impedance, so that the input signal to the filter 447 is blocked.

In this case, the diode 445 may be omitted according to the design condition of the filter.

In the case of an answer to the CO line, a talking loop to the CO line is established by hooking OFF the handset of the key telephone set (for instance, 2), and pressing a CO line selecting key (not shown) to enable the talking operation.

Further, in the case of calling from the CO line, a relay 480, not shown, is actuated by the abovesaid operation at first and, by opening of its contact 480-1, the relay 405 is made inoperative to restore its contact 405-1 to cut off the call signal (AC signal current) from the oscillator 408, stopping the call from the CO line.

As described above, the present system enables a call from the CO line and a call from the intercomm. line using the same control line.

Figure 7:
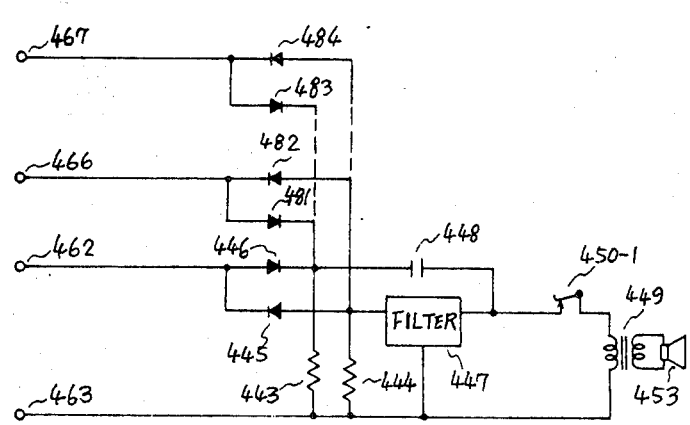
FIG. 7 is a circuit diagram illustrating a modification of a part of the embodiment shown in FIG. 6.

In the above, the system of this invention has been described in connection with the case of one CO line, but the present system is also applicable to the case of using more CO lines. In this case, the network 500 in FIG. 6 is increased in number in correspondence to the number of CO lines used, and the control lines 470 connecting the networks to the key telephone sets are also increased. (The ground E may be common.). Accordingly, as shown in FIG. 7, at the side of the key telephone set, a plurality of control lines from the key service unit 1 are respectively connected to terminals 467, 466 and 462 and the terminal 463 (common.). FIG. 7 shows the case of using three CO lines. With such an arrangement, when one of the CO lines is busy and the network corresponding to this CO line cannot be used as usually occured under the design of the overall system of the key telephone system, a CO line calling signal and an intercomm. calling signal sent from other control lines, for example, when an incoming call arrives at another CO line, are applied to the speaker 453.

The operation of the example shown in FIG. 7 is as follows: In a case where three CO lines are used and corresponding networks are respectively connected to them, when the network 500 connected to the terminal 462 cannot be used because it is busy, even if a calling signal is applied to the terminal 462 from the CO line, the ringing signal is cut off. However, the circuits of the networks 500 connected to the terminals 466 and 467 are capable of sending the ringing signal and when a calling signal is applied to the terminal 466 from the CO line and the ringing signal is sent out from the oscillator 408, the speaker 453 can be energized through a diode 482 or 481 in the same manner as in the case of energizing the speaker 453 through the diode 446 or 445. At this time, the circuit structures of the diodes 445, 446, 481, 482, 483 and 484 also each have the function of preventing echo of a signal across the control lines.

Figure 8:
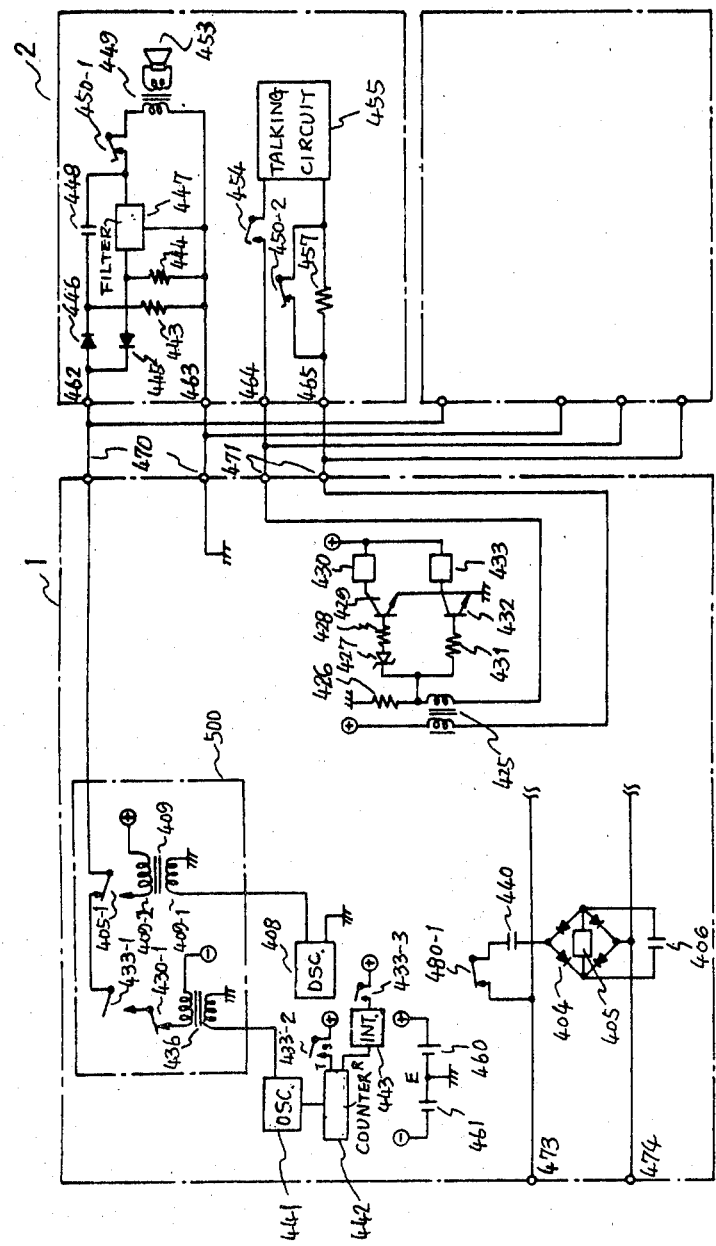
FIG. 8 is a circuit diagram illustrating further embodiment of this invention.

Next, FIG. 8 illustrates another embodiment of this invention. In FIG. 8, the same reference numerals as those in FIGS. 6 and 7 indicate the same parts. In FIG. 8, reference numerals 433-2 and 433-3 designate contacts of the relay 433; 441 identifies an oscillator which is supplied with a signal from a counter 442 to generate signals of a plurality of frequencies; 442 denotes the counter; and 443 represents an integrator. The embodiment of FIG. 8 is different from that of FIG. 6 in the following point: Namely, in FIG. 6, the oscillator for the individual intercomm. call is provided in the key telephone set and the selection of the oscillation frequency of the oscillator is accomplished directly by the contact as of the individual intercomm. call key. In FIG. 8, however, an oscillator corresponding to that 456 is provided in the key service unit 1 (an oscillator 441) and, for the selection of its oscillation frequency, the counter 442 is actuated by a signal such as dial pulses supplied from the key telephone set, by known means, and the oscillation frequency of the oscillator 41 is selected by an output signal from the counter 42.

The operation of the embodiment of FIG. 8 will hereinbelow be described. Let it be assumed that the talking circuit 455 is an ordinary telephone circuit and includes a rotary dial. At first, when the calling party takes up the handset for individual intercomm. calling operation, the talking loop, described previously in connection with (1) Intercomm. calling operation, is formed to flow a direct current in the talking circuit 455, thereby to actuate the relays 430 and 433. By the operation of the contact 433-3, the power source ⊕ is connected to a reset terminal R of the counter 424 through the integrator 443 to release the reset state of the counter 442, that is, enable the counting operation. Next, when a dial is turned in correspondence to a predetermined called intercomm. telephone number, the abovesaid talking loop is interrupted at dial contacts, so that the relays 430 and 433 are also actuated and restored repeatedly in synchronism with the interruption of the talking loop and their contacts 433-2 and 433-3 are also turned ON and OFF. By the interruption of the contact 433-2, pulse voltages from the power source ⊕ are applied to an input terminal T of the counter 442 and the pulses are counted by the counter 442. Then, the output signal from the counter 442 is applied to the oscillator 441 to select the corresponding one of the oscillation frequencies of the oscillator 441. The output from the oscillator 441, that is, the selected frequency signal is applied to the winding (the lower winding) of the transformer 436 to exite it. Next, when the calling party presses the individual intercomm. calling button, the fixed resistor 457 is inserted in series in the aforesaid talking loop and, by the same operation as described previously, the relay 430 is released to close its contact 430-1, so that the output signal applied to the transformer 436 from the oscillator 441 is applied to the speaker 453 of the called key telephone set through the same individual intercomm. calling loop as described above, energizing the speaker.

To the reset terminal of the counter 442, the contact 433-3 is connected through the integrator 443 and, as described above, the contact 433-3 makes in the off-hook state, but is interrupted during the dialing operation. Accordingly, in order that this interruption is not applied to the reset terminal R, pulse signals produced by the interruption are absorbed by the integrator 443. However, when the contact 433-3 breaks for a sufficiently long time as compared with the pulse width, a signal indicative of this state is applied to the reset terminal R to reset the counter 442. With the above operation, individual intercomm. calling is enabled. Intercomm. answering and talking operations are achieved in the same manner as the operation already described.

As has been set forth in the foregoing, the present invention provides a calling system which enables a calling operation from the CO line and an individual intercomm. calling operation with the use of a cable having a very small number of conductors as compared with that employed in the prior art. This is very effective for the reduction of the number of cable conductors of the key telephone system, and is of great utility in practical use.

What I claim is:
1. A key telephone system comprising:
   a plurality of key telephone sets;
   at least one pair of CO lines, an equal number of control lines and a common line;
   a key service unit for selectively connecting said key telephone sets to said at least one pair of CO lines under control of said common line and said control lines;
   said key service unit comprising: a DC power source for continuously producing two output voltages respectively having a certain positive voltage difference and a negative voltage difference with respect to a reference voltage, said output voltages being representative of an initial state and an operating state, respectively; a number of first detectors equal to the number of pairs of CO lines and respectively connected to the control line for detecting the initial state in which one of the two output voltages from said DC power source is applied across the control line and the common line to flow a current of predetermined value in a DC loop including the control line, one of said key telephone sets and the common line and for generating an output in response to the detected state; a number of second detectors equal to the number of pairs of CO lines and respectively connected to the control line in response to the output of a corresponding one of the first detectors for detecting the operating state in which the other of the two output voltages from said DC power source is applied across the control line and the common line so as to flow a current larger than a certain value in said DC loop and for generating an output in response to the state detected; and switching means for disconnecting said first detector from the control line in response to the output of a corresponding one of the second detectors and for connecting a corresponding second detector to the control line when the first detector produces said output.

2. A key telephone system according to claim 1, wherein the first detector has a self-holding function to provide the switching means with the self-holding function.

3. A key telephone system according to claim 1, wherein the second detector has a self-holding function to provide the switching means with the self-holding function.

4. A key telephone system according to claim 1, wherein a plurality of pairs of CO lines are provided, wherein a plurality of control lines are provided in one to one correspondence to the CO lines, and wherein a plurality of said first detectors, a plurality of said second detectors and a plurality of switching means are provided in one to one correspondence to a plurality of said CO lines.

5. A key telephone system according to claim 1, in which each of said key telephone sets comprises a talking circuit, switching means for connecting the talking circuit to a selected one of a pair of CO lines and an intercomm. line, at least one light emitting element provided in correspondence to a control line and emitting light when the control line is at the potential of one of said two voltages, control means having an ON-OFF switching element for forming a DC loop across the control line and the common line, and a speaker circuit coupled to the control line, and in which the control means has a circuit element connected in series to the switching element for producing a voltage drop necessary for the light emitting element to emit light when said one voltage is applied to the control line.

6. A key telephone set according to claim 5, wherein the light emitting member has a current limiting function.

7. A key telephone set according to claim 5, wherein a voltage drop in the circuit element connected to the switching element is negligible when the control line is at the other of the two voltages.

8. A key telephone system according to claim 1, comprising, in each of said key telephone sets, a holding key for a holding function, a capacitor circuit comprised of a plurality of capacitors connected for switching from a parallel connection to a series connection with respect to each other by the operation of the holding key, and a CO line selecting key connected in series with the capacitor circuit, and comprising, in said key service unit, at least one fourth detector in one to one correspondence with the CO line and selectively connected to said at least one control line including the common line to operate at a third current value smaller than the first current value, at least one first relay provided in one to one correspondence with the CO line and having a slow-releasing characteristic to operate with an output signal from the second detector, and at least one second relay provided in one to one correspondence with the CO line and having a self-holding function to operate at an operate time only when a current smaller than the third current value flows through said common line and said control line during operation of the first relay and for forming a DC holding loop across conductors of the CO line, each of said key telephone sets being further provided with means responsive to the operation of the first relay for applying a voltage comprising the sum of charging voltages of the capacitors across the common line and the control line in such a manner that the voltage may exceed the value of a voltage applied from the key service unit, and wherein the second detector and the fourth detector are simultaneously restored by the actuation of the holding key to actuate the second relay.

9. A key telephone system according to claim 8, wherein the voltage applied from the key service unit is supplied through a detecting resistor common to the second and fourth detectors.

10. A key telephone system according to claim 9, wherein a power source for the second detector and said fourth detector includes circuit means for producing a voltage drop accompanying the output currents from the second detector and the fourth detector and for reducing the voltage drop at least after the lapse of a longer period of time than the operate time of the second relay when the output currents are reduced to zero or nearly equal to zero.

11. A key telephone system according to claim 8, wherein the capacitor circuit is composed of two capacitors.

12. A key telephone system according to claim 8, wherein the capacitor circuit is composed of three capacitors.

13. A key telephone system according to claim 8, wherein a plurality of pairs of CO lines are provided, wherein a plurality of control lines are provided in one to one correspondence with the CO lines, and wherein a plurality of first detectors, a plurality of second detectors, a plurality of first relays and a plurality of second relays are provided respectively in one to one correspondence with a plurality of said CO lines.

14. A key telephone system according to claim 1, in which an intercomm. line is provided, in which each of said key telephone sets comprises means for inserting a resistor in said intercomm. line in series with the talking circuit at the time of intercomm. calling operation by a corresponding one of said key telephone sets, and a speaker circuit connected in common to the plurality of control lines, and in which said key service unit comprises at intercomm. calling detector for detecting a change in a talking direct current cuased by the series insertion of the resistor in the intercomm. line to detect the state of individual intercomm. calling status where the current flowing in the intercomm. line is smaller than a normal talking current but larger than a predetermined current, a ringing tone source, and a plurality of third connecting means respectively corresponding to the CO lines for connecting the ringing tone source across a corresponding one of the plurality of control lines and the common line only when the intercomm. calling detector detects said intercomm. calling status.

15. A key telephone system according to claim 14, wherein the third connecting means each include means for decoupling.

16. A key telephone system according to claim 14, wherein the third connecting means include means for decoupling the control lines with respect to the output from the ringing tone source.

17. A key telephone system according to claim 15, wherein the decoupling means is an inductance element.

18. A key telephone system according to claim 16, wherein the decoupling means is a hybrid coil.

19. A key telephone system according to claim 16, wherein the decoupling means are a plurality of unidirectional amplifiers inserted in the plurality of the control lines and connected to the speaker circuit.

20. A key telephone system according to claim 1, in which an intercomm. line is provided, in which each of said key telephone sets comprises means for inserting a resistor in the intercomm. line in series with a talking circuit at the time of intercomm. calling operation by a corresponding one of said key telphone sets, and a speaker circuit connected in common to the plurality of control lines, and in which said key service unit comprises an intercomm. calling detector for detecting a change in a talking direct current caused by the series insertion of the resistor in the talking line to detect the state of individual intercomm. calling status where the current flowing in the intercomm. line is smaller than a normal talking current but larger than a predetermined current, a plurality of third connecting means in one to one correspondence with the CO lines for connecting a ringing tone source across a corresponding one of the plurality of control lines and the common line only when the intercomm. calling detector detects said intercom. calling status, said ringing tone source being provided for sending out a status signal indicative of an intercomm. calling state, and a plurality of fourth connecting means provided in correspondence to the control lines and each coupled with a corresponding one of the plurality of third connecting means for connecting the ringing tone source and one of the second detectors to a corresponding one of a plurality of said control lines in the intercomm. calling state and disconnecting only the ringing tone source from the control line in response to the output from the corresponding one of a plurality of said second detectors.

21. A key telephone system comprising:
a plurality of key telephone sets;
a key service unit for selectively connecting said key telephone sets to at least a pair of CO lines under control of a common line and at least one control line provided in one to one correspondence with the CO lines, said key service unit comprising: a DC power source for continuously producing two output voltages respectively having a certain positive voltage difference and a negative voltage difference with respect to a reference voltage, said output voltages being representative of an initial state and an operating state, at least one first detector provided in one to one correspondence with the pair of CO lines and selectively connected to the control line for detecting the initial state in which one of the two output voltages from said DC power source is applied across the control line and the common line to flow a predetermined current in a DC loop including the control line, one of said key telephone sets and the common line and for generating an output in response to the detected state, at least one second detector provided in one to one correspondence with the pair of CO lines and selectively connected to the control line in response to the output of the first detector for detecting the operating state in which the other of the two output voltages from said DC power source is applied across the control line and the common line to flow a current larger than a certain value in said DC loop and for generating an output in response to the detected state, at least one switching means provided in one to one correspondence with the pair of CO lines for disconnecting the first detector from the control line in response to the output of the second detector and for connecting the second detector to the control line when the first detector produces said output, at least one third detector provided in one to one correspondence with the pair of CO lines and connected to the CO lines for detecting the arrival of an incoming signal at the CO lines, a first signal source for sending out a status signal indicative of the state of reception, and at least one first connecting means in one to one correspondence with the pair of CO lines for connection of the first signal source and the second detector to the control line in response to the output from the third detector and for disconnecting the first signal source from the control line in response to the output from the second detector.

22. A key telephone system according to claim 21, wherein the first signal source is a signal source for sending out a tone signal.

23. A key telephone system according to claim 21, wherein the first signal source is a DC signal source for sending out a DC signal.

24. A key telephone system according to claim 21, wherein the first signal source is a signal source for sending out a tone signal and a DC signal.

25. A key telephone system according to claim 21, wherein a plurality of pairs of CO lines are provided, wherein a plurality of control lines are provided in one to one correspondence with the CO lines, and wherein a plurality of said first detectors and a plurality of said second detectors, a plurality of said switching means, a plurality of said third detectors and a plurality of said third connecting means are provided respectively in one to one correspondence with a plurality of said CO lines.

26. A key telephone system comprising:
a plurality of key telephone sets;
a key service unit for selectively connecting said key telephone sets to at least a pair of CO lines under control of a common line and at least one control line provided in one to one correspondence with the C0 lines;
said key service unit comprising; a DC power source for continuously producing two output voltages respectively having a certain positive voltage difference and a negative voltage difference with respect to a reference voltage, said output voltages being representative of an initial state and an operating state, respectively, at least one first detector provided in one to one correspondence with the pair of CO lines and selectively connected to the control line for detecting the initial state in which one of the two output voltages from the DC power source is applied across the control line and the common line to flow a predetermined current in a DC loop including the control line, one of said key telephone sets and the common line and for generating an output in response to the detected state, at least one second detector provided in one to one correspondence with the pair of CO lines and selectively connected to the control line in response to the output of the first detector for detecting the operating state in which the other of the two output voltages from the DC power source is applied across the control line and the common line to flow a current larger than a certain value in said DC loop and for generating an output in response to the detected state, at least one switching means provided in one to one correspondence with the pair of CO lines for disconnecting the first detector from the control line in response to the detector output of the second detector and for connecting the second detector to the control line when the first detector produces said output, a second signal source for sending out a second status signal indicative of the CO line seizing state, and at least one second connecting means provided in one to one correspondence with the pair of CO lines for connecting the second signal source to the control line in the period in which the output from the second detector exists.

27. A key telephone system according to claim 26, wherein the second status signal is a DC signal.

28. A key telephone system according to claim 26, wherein a plurality of pairs of CO lines are provided, wherein a plurality of control lines are provided in one to one correspondence with the CO lines, and wherein a plurality of said first detectors, a plurality of said second detectors, a plurality of said switching means and a plurality of said second connecting means are provided respectively in one to one correspondence with the plurality of said CO lines.

29. A key telephone system comprising:
a key service unit;
a plurality of key telephone sets connected to the key service unit through at least one control line and a common line;
an oscillator provided in said key service unit for generating one of a plurality of different voice frequencies;
connecting and transmitting means provided in said key service unit for applying the output from said oscillator across one end of at least one control line and a common line in accordance with an intercomm. calling operation,
a speaker circuit provided in each of said key telephone sets,
a filter circuit provided in each of said key telephone sets for selecting and applying one of the voice frequencies to the corresponding speaker circuit;
by-pass means provided in each of said key telephone sets and connected in parallel with the corresponding filter circuit for passing a ringing signal not having passed through the filter circuit to the corresponding speaker circuit;
first voltage applying means provided in said key service unit for applying to the control line a predetermined one of two voltages respectively higher and lower than the potential of the common line in accordance with the intercomm. calling operation;
second voltage applying means provided in said key service unit for applying the other of the two voltages to the control line at a calling operation different from the individual intercomm. calling operation; and
at least one switching means provided in said key service unit and each of said key telephone sets in one to one correspondence with the control line for connecting the filter circuit to the control line at the individual intercomm. calling operation and for connecting the by-pass circuit to the control line at the calling operation different from the individual intercomm. calling operation depending upon whether the higher or lower voltage is applied to the control line.

30. A key telephone system according to claim 29, wherein the switching means is comprised of two diodes connected at one end to the control line in reverse directions and at the other end to the by-pass circuit and the filter circuit, respectively.

31. A key telephone system using a pair of talking lines, a common line and at least one control line, comprising:
a key service unit;
a plurality of key telephone sets connected to the key service units through said lines;
an oscillator provided in said key service unit for generating one of a plurality of different voice frequencies and having a DC resistance necessary for an output circuit;
connecting and transmitting means provided in said key service unit for inserting the output circuit of the oscillator in the talking line in series with a talking circuit of the corresponding one of said key telephone sets only at an individual intercom. calling operation;
a speaker circuit provided in each of said key telephone sets;
a filter circuit provided in each of said key telephone sets for selecting and applying one of the voice frequencies to the corresponding speaker circuit;
by-pass means provided in each of said key telephone sets and connected in parallel with the filter circuit for passing a ringing signal not having passed through the filter circuit to the corresponding speaker circuit;
a detector provided in said key service unit for detecting a change in a talking direct current flowing through the DC resistance by the series connection of the output circuit of the oscillator to the talking line to detect a state of an individual intercomm. calling operation wherein a current flowing in the talking line is smaller than a normal talking current but larger than a current when the oscillator is inserted in the talking line;
first voltage applying means provided in said key service unit for transmitting the output applied to the talking line from the oscillator to said control line and for applying to the control line a predetermined one of two voltages respectively higher and lower than the potential of the common line only at the individual intercomm. calling operation;
second voltage applying means provided in said key service unit for applying the other of the higher and lower voltages to the control line at a calling operation different from the individual intercomm. calling operation; and
at least one switching means provided in said key service unit and each of said key telephone sets in one to one correspondence with the control line for connecting the filter circuit to the control line at the individual intercomm. calling operation and for connecting the by-pass circuit to the control line at the calling operation different from the individual intercomm. calling operation depending upon whether the higher or lower voltage is applied to the control line.

32. A key telephone system according to claim 31, wherein the switching means is composed of two diodes connected at one end to the control line in reverse directions and at the other end to the by-pass circuit and the filter circuit, respectively.

33. A key telephone system using a pair of talking lines, a common line and at least one control line, comprising:
- a key service unit;
- a plurality of key telephone sets connected to the key service units through said lines;
- an oscillator provided in said key service unit for generating one of a plurality of different voice frequencies;
- a resistor provided in each of said key telephone sets and having a required DC resistance value,
- connecting means provided in each of said key telephone sets and for inserting the resistor in the talking line in series with a talking circuit of the corresponding one of said key telephone sets only at an intercomm. calling operation;
- a speaker circuit provided in each of said key telephone sets,
- a filter circuit provided in each of said key telephone sets for selecting and applying one of the voice frequencies to the corresponding speaker circuit;
- by-pass means provided in each of said key telephone sets and connected in parallel with the filter circuit for passing therethrough a calling signal not having passed through the corresponding filter circuit and applying the calling signal to the corresponding speaker circuit,
- a detector provided in said key service unit for detecting a change in a talking direct current caused by the series insertion of the resistor in the talking line to detect a state of an individual intercomm. calling operation where a current flowing in the talking line is smaller than a normal talking current but larger than a predetermined current,
- first voltage applying means provided in said key service unit for applying to the control line the output from the oscillator and a predetermined one of two voltages respectively higher and lower than the potential of the common line only at the individual intercomm. calling operation; and
- at least one switching means provided in said key service unit and each of said key telephone sets in one to one with the control line for connecting the filter circuit to the control line at the individual intercomm. calling operation and for connecting the by-pass circuit to the control line at the time of the calling operation different from the individual intercomm. calling operation depending upon whether the higher or lower voltage is applied to the control line.

34. A key telephone system according to claim 33, wherein the switching means is composed of two diodes connected at one end to the control line in reverse directions and at the other end to the by-pass circuit and the filter circuit, respectively.

* * * * *